United States Patent [19]
Sato et al.

[11] Patent Number: 6,115,652
[45] Date of Patent: Sep. 5, 2000

[54] ROAD SYSTEM FOR AUTOMATICALLY TRAVELING VEHICLE

[75] Inventors: Masashi Sato; Eishi Jitsukata; Sachio Kobayashi; Kazuya Tamura, all of Wako, Japan

[73] Assignee: Honda Giken Kogyo Kabushiki, Tokyo, Japan

[21] Appl. No.: 09/078,486

[22] Filed: May 14, 1998

[30] Foreign Application Priority Data

May 15, 1997 [JP] Japan ...................................... 9-125536

[51] Int. Cl.[7] .................................................. G06F 165/00
[52] U.S. Cl. ................................ 701/28; 701/117; 701/23
[58] Field of Search ................................. 701/28, 23, 25, 701/26, 117; 340/902, 903, 905

[56] References Cited

U.S. PATENT DOCUMENTS

| | | | |
|---|---|---|---|
| 3,493,923 | 2/1970 | Stevens et al. | 340/905 |
| 3,668,624 | 6/1972 | Spaulding | 340/905 |
| 4,361,202 | 11/1982 | Minovitvh | 180/168 |
| 5,329,449 | 7/1994 | Tanizawa et al. | 701/25 |
| 5,347,456 | 9/1994 | Zhang et al. | 701/23 |
| 5,351,044 | 9/1994 | Mathur et al. | 340/901 |
| 5,682,030 | 10/1997 | Kubon | 235/462.25 |
| 5,887,268 | 3/1999 | Furukawa | 701/23 |
| 5,925,090 | 7/1999 | Poonsaengsathit | 701/211 |

FOREIGN PATENT DOCUMENTS 7-283973  10/1996  Japan .

*Primary Examiner*—Tan Nguyen
*Assistant Examiner*—Eric M Gibson
*Attorney, Agent, or Firm*—Arent Fox Kintner Plotkin & Kahn PLLC

[57] ABSTRACT

A road system for an automatically traveling vehicle is provided, wherein the merging or diverging of the automatically traveling vehicle at a connection point of a road can be smoothly performed. An indicating means comprising a bar code is provided on each of a main lane and a branch lane at a location short of a merging point of a road by a predetermined distance (e.g., 500 m). Information relating to the distance from one vehicle to the merging point and information relating to the shape of the merging point are provided by viewing the indicating means with a CCD camera. The indicating means can be provided at a location short of a diverging point of the road, at the merging point of the road or at the diverging point of the road. The type of the indicating means is not limited to the bar code, and the indicating means may be a signpost, a line, magnetic nails or the like.

2 Claims, 7 Drawing Sheets

ROAD SYSTEM FOR AUTOMATICALLY TRAVELING VEHICLE

BACKGROUND OF THE INVENTION

1. Field of the Invention

The present invention relates to a road system for an automatically traveling vehicle (hereinafter "one vehicle"), on which the automatically traveling vehicle automatically travels on the basis of information provided by a road-vehicle communication between the vehicle and information transmitting means provided on or near the road and information provided by vehicle-vehicle communication between the one vehicle and another vehicle.

2. Description of the Prior Art

An automatically traveling vehicle designed to travel automatically based upon data provided by road-vehicle communication and vehicle-vehicle communication has already been proposed by the present assignee (see Japanese Patent Application No. 7-283973).

When an automatically traveling vehicle merges into or diverges from a main lane from or into a branch lane of a road at a merging point or diverging point between both the lanes, it is necessary to perceive or recognize data such as the distance from the one vehicle to the merging point or the diverging point (which will be referred to as a "connection point" hereinafter) and the position and shape of the connection point. However, a means for providing such data is not provided on a road for an automatically traveling vehicle which has been conventionally proposed.

SUMMARY OF THE INVENTION

The present invention has been accomplished with the above circumstance in view, and it is an object of the present invention to provide a road system for an automatically traveling vehicle, wherein the merging and diverging of the automatically traveling vehicle at the connection point of the road can be smoothly carried out.

To achieve the above object, there is provided a road system for an automatically traveling vehicle, the road system comprising a road having a main lane, at least one branch lane, and a connection point connecting the main lane with the one branch lane, indicating means on or near the road in a location short of the connection point, detecting means located in the traveling vehicle for detecting the indicating means, determining means for determining a distance from the indicating means or the traveling vehicle to the connection point, and transmitting means located on or near the road for transmitting information to the traveling vehicle, wherein the vehicle automatically travels based on said information and information provided by communication between the vehicle and other traveling vehicles.

The detecting means is a viewing means, and the indicating means is a bar code provided on a road surface. With this arrangement, it is possible to provide the distance information from the one vehicle to the connection point by reading the bar code by the viewing means.

In another embodiment, the detecting means is a viewing means, and the indicating means is a distance signpost provided on or near the road. With this arrangement, it is possible to not only provide the distance information from the one vehicle to the connection point by reading the distance signpost with the viewing means, but also it is possible for a driver to directly obtain the distance information by visually perceiving the distance signpost.

The shape of the connection point between the main lane and branch lane is also provided on the distance signpost. With this arrangement, in addition to the distance information from the one vehicle to the connection point, information relating to the shape of the connection point can be provided.

In a further embodiment, the detecting means is a magnetic sensor, and the indicating means is a large number of magnetic nails embedded in a road surface. With this arrangement, the distance information from the one vehicle to the connection point can be provided by detecting the magnetic nails with the magnetic sensor.

The distance from the one vehicle to the connection point is indicated on the basis of the distance between the magnetic nails or the sequence of arrangement of the poles of the magnetic nails. With this arrangement, various distance information can be indicated by only changing the distance between the existing magnetic nails or the sequence of arrangement of poles of the existing magnetic nails.

The present invention provides a road system for an automatically traveling vehicle, the road system comprising a road having a main lane, at least one branch lane and a connection point connecting the main lane with the at least one branch lane, indicating means located at the connection point for indicating the position and shape of the connection point, detecting means located in the traveling vehicle for detecting the indicating means, and transmitting means located on or near the road for transmitting information to the traveling vehicle, wherein the vehicle automatically travels based on said information and information provided by communication between the vehicle and other traveling vehicles. With this arrangement, the information related to the position and shape of the connection point between the main and branch lanes can be provided to the vehicle to properly perform the control of the merging or diverging.

The detecting means is a viewing means, and the indicating means is a line provided along a road surface. With this arrangement, the information related to the position and shape can be provided by reading the line with the viewing means.

In another embodiment, the detecting means is a magnetic sensor, and the indicating means is a large number of magnetic nails embedded in a road surface. With this arrangement, the information relating to the position and shape can be provided by detecting the magnetic nails with the magnetic sensor.

The position and shape of the connection point are indicated on the basis of the distance between the magnetic nails or the sequence of arrangement of poles of the magnetic nails. With this arrangement, the information relating to various positions and shapes of the connection point can be indicated by only changing the distance between the existing magnetic nails or the sequence of arrangement of poles of the existing magnetic nails.

DETAILED DESCRIPTION OF THE PREFERRED EMBODIMENT

Figure 1:
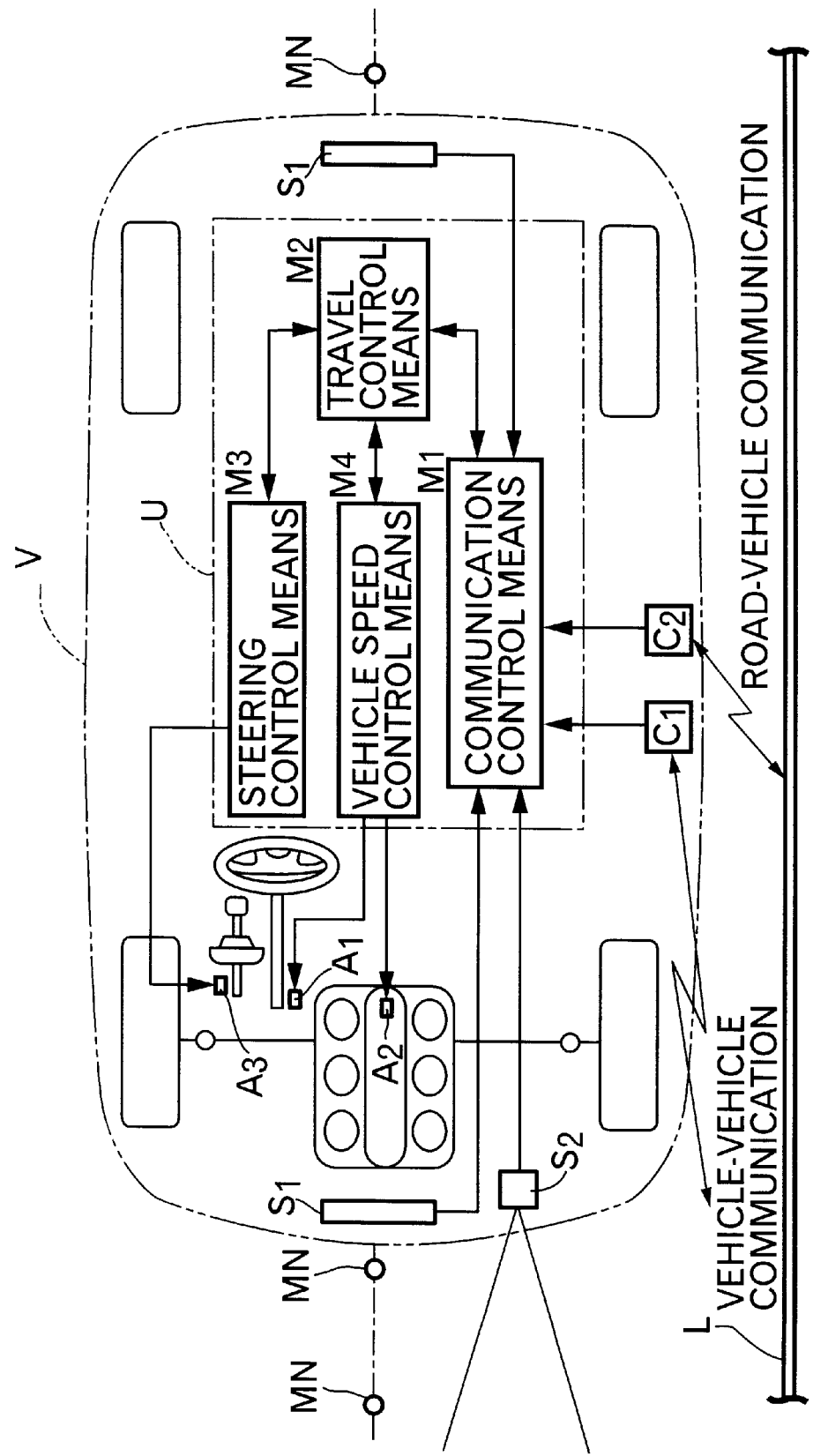
FIG. 1 is an illustration of the entire arrangement of an automatically traveling vehicle according to an embodiment of the present invention.

A vehicle V shown in FIG. 1 is an automatically traveling vehicle which automatically travels on an automatic travel road having magnetic nails MN embedded therein along a central portion of a lane, and a leaking coaxial cable L mounted along a side portion of the lane, or a vehicle which automatically travels in a group of a plurality of vehicles traveling in a line at predetermined distances maintained between vehicles. To allow the vehicle to automatically travel, the vehicle V includes an electronic control unit U having a communication control means M1, a travel control means M2, a steering control means M3, and a vehicle speed control means M4.

The communication control means M1 performs the communication between the vehicles with a vehicle-vehicle communication device $C_1$, the road-vehicle communication with the leaking coaxial cable L and a road-vehicle communication device $C_2$, the detection of the magnetic nails MN by magnetic nail sensors $S_1$ and the detection of an indicating means M (see FIG. 5) by a viewing means, such as CCD camera $S_2$. Data such as the position, the vehicle speed, the longitudinal acceleration and the like of the vehicle V are interchanged by the vehicle-vehicle communication, and speed command information, road curvature information, traffic snarl information, urgent messages and the like are received by the road-vehicle communication. In addition, it can be determined by the road-vehicle communication whether the one vehicle is currently traveling on a main lane or a branch lane of an automatic travel road.

Figure 5:
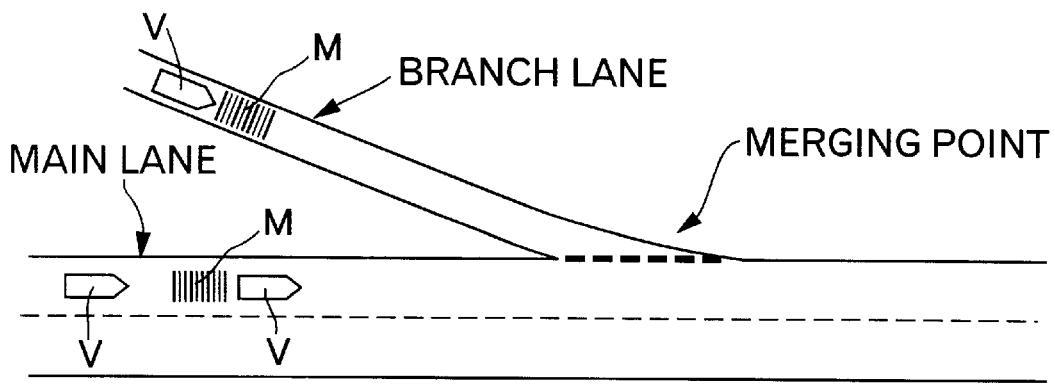
FIG. 5 is a diagram illustrating an indicating means provided at a location short of a merging point.

As shown in FIG. 5, the indicating means M is comprised of a bar code drawn by a paint on the main lane and the branch lane, for example, 500 m short of a merging point of a road. The contents of the indicating means M indicate that the position of the bar code is 500 m short of the merging point. The indicating means M on the branch lane indicates that the main lane is connected on the right of the branch lane, and the indicating means M on the main lane indicates that the branch lane is connected on the left of the main lane. Therefore, the contents of the information can be read by viewing the indicating means M with the CCD camera $S_2$ on the vehicle V passing through the indicating means M to perform a picture processing.

The travel control means M2 is adapted to calculate a lateral positional deviation and a longitudinal positional deviation of the one vehicle by making a travel control program in order to allow a single vehicle or leading vehicle traveling in a group of vehicles to automatically travel, in order to allow the second and succeeding vehicles in the group to automatically travel (to follow the leading vehicle) and in order to allow the vehicle to automatically merge or diverge into or from a main lane from or into a branch lane of a road, and comparing a target traveling state of the one vehicle determined on the basis of the travel control program with an actual traveling state detected by the magnetic nail sensors $S_1$.

The steering control means M3 is adapted to output a steering angle indicating signal based on the lateral deviation calculated in the travel control means M2 to control a steering actuator $A_1$. The automatic traveling of the vehicle along the magnetic nails MN is carried out by the control of the steering actuator $A_1$.

The vehicle speed control means M4 is adapted to output a vehicle speed indicating signal based on the longitudinal deviation calculated in the travel control means M2 to control a throttle actuator $A_2$ or a brake actuator $A_3$. A throttle or a brake is driven by the control of the actuators $A_2$ and $A_3$ to automatically accelerate or decelerate the vehicle V, thereby conducting the automatic traveling of the vehicle according to the travel control program.

Figure 2A:
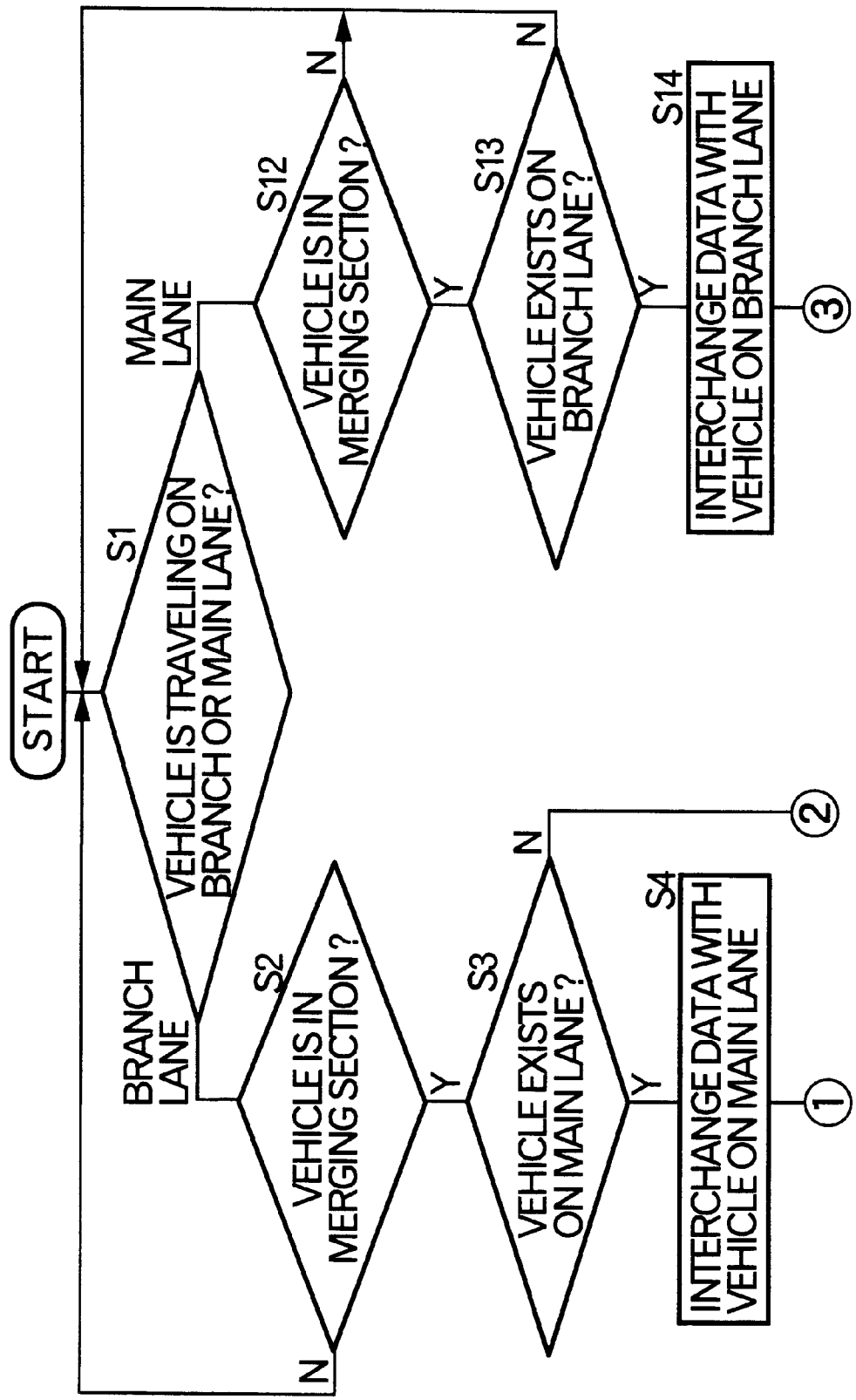
FIGS. 2A and 2B show a flow chart for explaining the operation during merging.
Figure 2B:
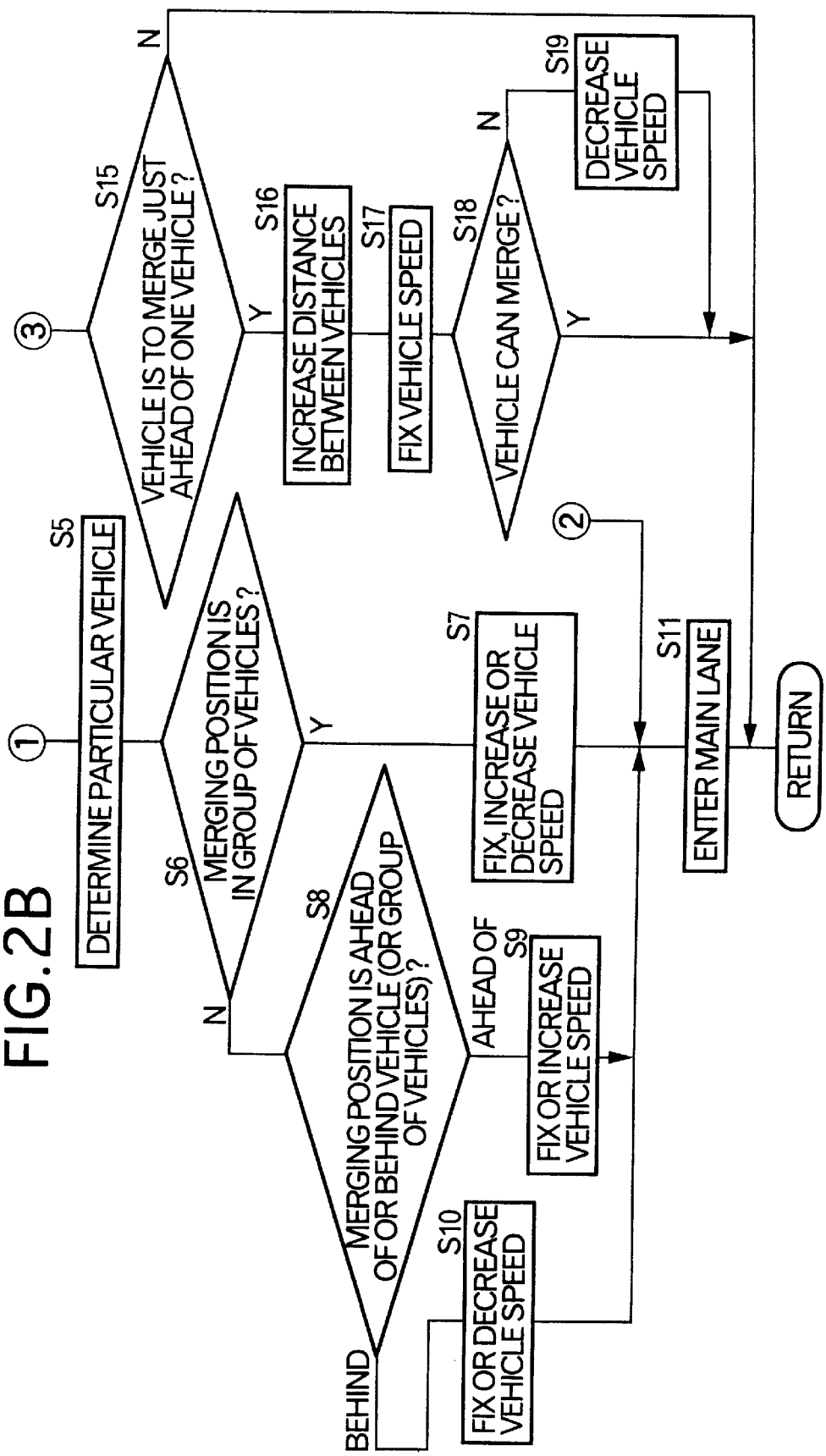

The operation during merging of the vehicle from the main lane into the branch lane or vice versa will be described below with reference to the flow chart shown in FIGS. 2A and 2B.

First, at Step S1, it is determined whether the one vehicle is traveling on the main lane or on the branch lane, by the road-vehicle communication carried out between the leaking coaxial cable L and the road-vehicle communication device $C_2$. When the one vehicle is traveling on the branch lane, it is determined at Step S2 whether the one vehicle is in a merging section near a merging point, on the basis of data of the one vehicle position provided by the road-vehicle communication. When the one vehicle is in the merging section, it is determined at Step S3 whether there is another vehicle traveling in the merging section on the main lane, on the basis of data of the other vehicle provided by the road-vehicle communication. As a result, if there is no other vehicle in the merging section on the main lane, there is no possibility that the one vehicle will interfere with the other vehicle upon the merging and hence, at Step S11, the one vehicle enters into the main lane. On the other hand, if there is another vehicle in the merging section on the main lane at Step S3, the interchange of data is carried out between the one vehicle and the other vehicle or the vehicles traveling in a group by means of the vehicle-vehicle communication, thereby providing data such as the position and the vehicle speed of the vehicle traveling on the main lane.

A small error exists in the position data of the one vehicle provided by the road-vehicle communication, and for this reason, the position data of the one vehicle provided by the road-vehicle communication is corrected to provide a precise position of the one vehicle by reading the indicating means M provided at a position short of the merging position with the CCD camera $S_2$. The correction of the one vehicle position is carried out with respect to both of the vehicle traveling on the main lane and the vehicle traveling on the branch lane and hence, the position data of another vehicle provided by the vehicle-vehicle communication is also precise.

Figure 3:
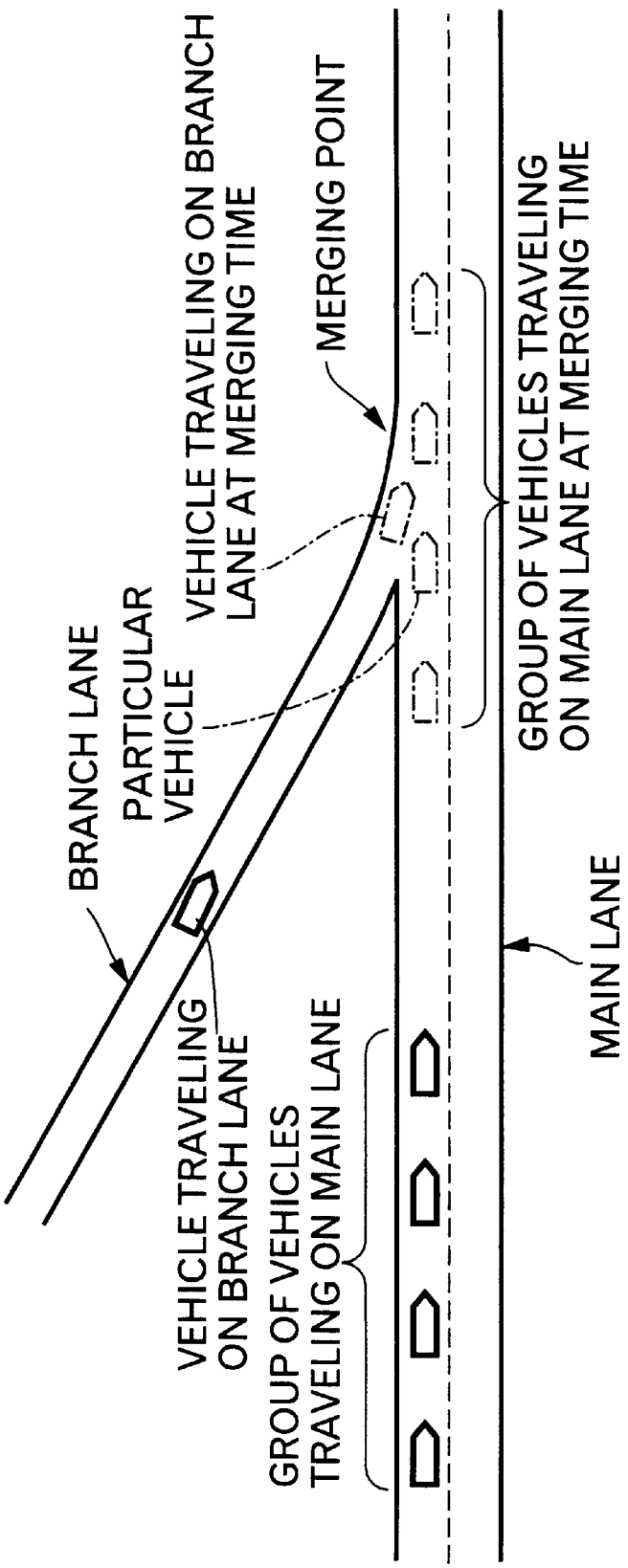
FIG. 3 is an illustration for explaining a technique for determining a particular vehicle.

Then, at Step S5, another particular vehicle (which will be referred to as a particular vehicle) is determined which may possibly interfere with the one vehicle when the one vehicle traveling on the branch lane, merges into a group of other vehicles traveling on the main lane at the merging point. More specifically, the merging time when the one vehicle reaches the merging point is presumed on the basis of the position and vehicle speed of the one vehicle, and a position at which another vehicle exists at such merging time is presumed, on the basis of the position and vehicle speed of the other vehicle on the main lane. A leading one of the other vehicles existing in positions short of the merging point at the merging time which is nearest to the merging point is determined as a particular vehicle (see FIG. 3).

Figure 4A:
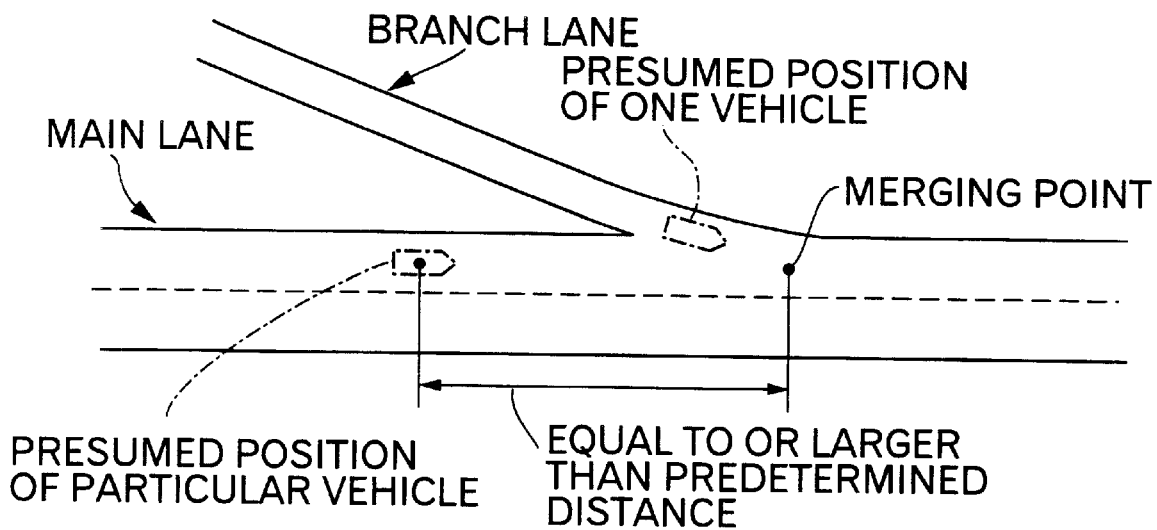
FIGS. 4A and 4B are illustrations for explaining the operation during merging.
Figure 4B:
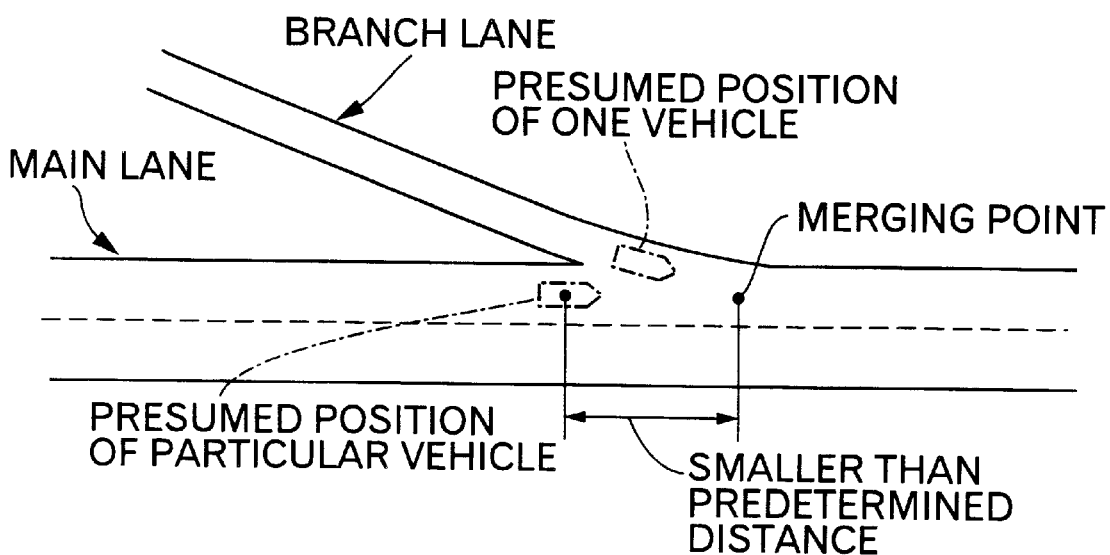

The particular vehicle on the main lane which has been determined in the above manner may be a single vehicle traveling alone without forming a group, or may be one of the vehicles forming a group. The one vehicle on the branch lane merges into the main lane in front of or to the rear of the particular vehicle depending upon the position of the particular vehicle. This will be further described below. It is presumed how far the particular vehicle is short of the merging point at a merging time when the one vehicle reaches the merging point. If the distance between the merging point and the particular vehicle is equal to or larger than a predetermined value, it is determined that there is no possibility that the one vehicle will interfere with the particular vehicle, thereby permitting the one vehicle to merge into the main lane in front of the particular vehicle (see FIG. 4A). Thus, the one vehicle can merge into the main lane in a short time without a wasteful deceleration. If the above-described distance is smaller than the predetermined value, it is determined that there is a possibility that the one vehicle may interfere with the particular vehicle, thereby permitting the one vehicle to merge into the main lane to the rear of the particular vehicle (see FIG. 4B). Thus, the one vehicle can merge smoothly into the main lane without interfering with another vehicle.

When the position of merging of the vehicle is in the group of the vehicles at Step S6, the one vehicle is fixed in speed, or accelerated or decelerated at Step S7 and enters into the main lane at Step S11. When the position of merging of the vehicle is in front of a vehicle traveling alone or the leading one of vehicles traveling in a group at Step S8, the one vehicle is fixed in speed or accelerated at Step S9. When the position of merging of the vehicle is to the rear of a vehicle traveling alone or trailing a rearmost one of vehicles traveling in a group at Step S8, the one vehicle is fixed in speed or decelerated at Step S10 and enters into the main lane at Step S11.

On the other hand, when the one vehicle is traveling on the main lane at Step S1, it is determined at Step S12 whether the one vehicle is in the merging section on the main lane. If the one vehicle is in the merging section, it is determined at Step S13 whether there is another vehicle traveling in the merging section on the branch lane. As a result, if there is other vehicle traveling in the merging section on the branch lane, the interchange of data is carried out between the one vehicle and the other vehicle traveling on the branch lane by the vehicle-vehicle communication at Step S14, thereby providing data such as the position and vehicle speed of the vehicle traveling on the branch lane.

Then, it is determined at Step S15 whether a vehicle traveling to merge into the main lane just in front of the one vehicle at the merging point, exists on the branch lane. If such a vehicle exists, the one vehicle is decelerated to increase the distance between the one vehicle and such vehicle at Step S16, so that such vehicle easily merges into the main lane. If the one vehicle is a single vehicle or leading one of a group of vehicles and a sufficient distance is maintained between the one vehicle and another vehicle traveling ahead of the one vehicle, the distance between the vehicles is not necessarily increased. Thereafter, the vehicle speed of the one vehicle is fixed at Step S17, so that it travels on the main lane so as not to exert influence on the control of the vehicle speed of a vehicle traveling on the branch lane.

Then, it is determined at Step S18 whether another vehicle traveling on the branch lane can merge into the main lane in front of the one vehicle. In principle, the merging is made possible by increasing the distance between the vehicles and fixing the vehicle speed of the one vehicle. However, if the merging is not possible, the one vehicle is decelerated at Step S19, so that another vehicle can merge into the main lane.

In the above way, accurate information with regard to the merging point can be provided by the indicating means M on the road by the paint and hence, the control of the merging can be properly performed.

Various embodiments can be considered for the indicating means M. Other embodiments of the indicating means M will be described successively.

Figure 6:
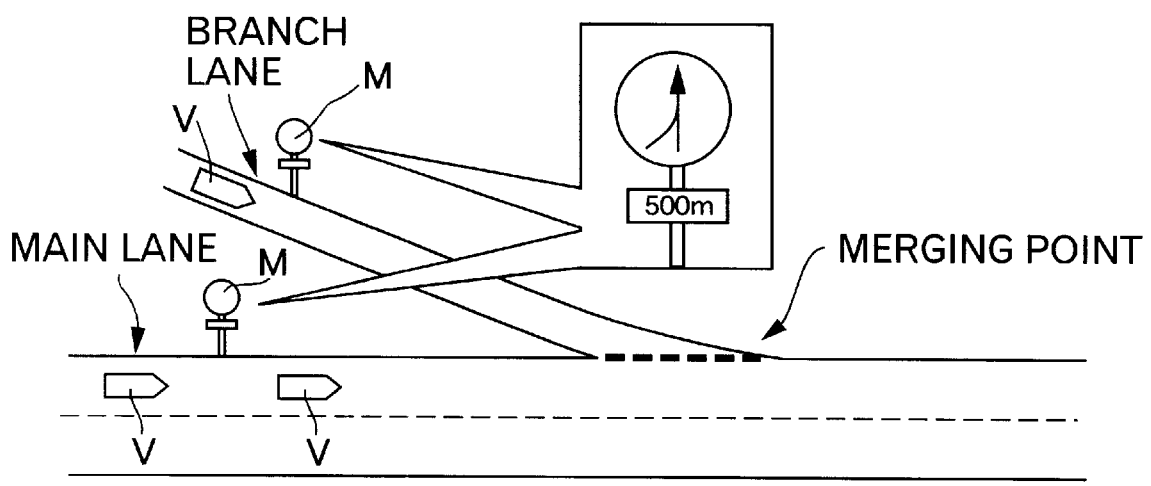
FIG. 6 is a diagram illustrating a second embodiment of an indicating means provided at a location short of a merging point.

In a second embodiment shown in FIG. 6, the indicating means M comprises a distance signpost provided on a side of each of the main lane and the branch lane. In addition to the distance to the merging point, the shape of the merging point is indicated on the distance signpost.

Figure 7:
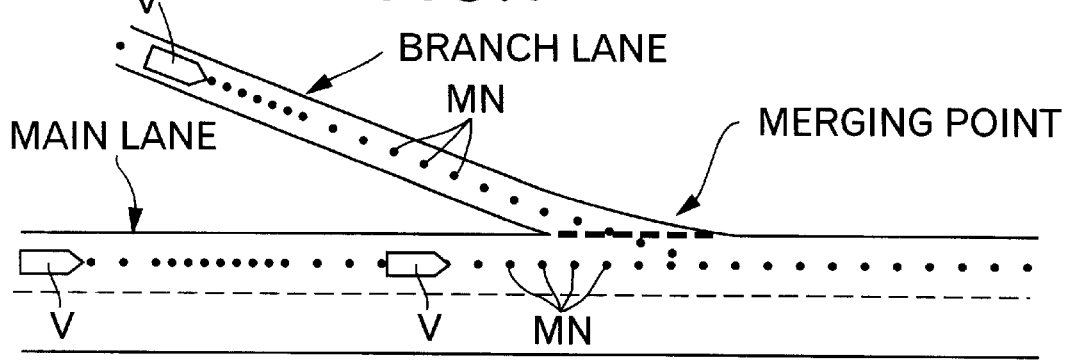
FIG. 7 is a diagram illustrating a third embodiment of an indicating means provided at a location short of a merging point.

In a third embodiment shown in FIG. 7, the indicating means comprises magnetic nails N adapted to be detected by the magnetic nail sensors $S_1$. The magnetic nails N are arranged usually at distances of 1 meter, and the direction of the N and S poles are also unified. However, the distance between the magnetic nails N may be changed at a location short of the merging point between the main and branch lanes, and the direction of the N and S poles may be changed for every nail, for example, as in sequence of N, N, N poles . . . , N, S, N poles . . . , or N, S, N, S, S, N poles . . . , thereby providing information for the distance to the merging point and the shape of the merging point to the vehicle V.

The first to third embodiments provide information relating to the merging point to the vehicle traveling on the main lane or the branch lane short of the merging point, but are applicable to the situation where information for a diverging point is provided to a vehicle traveling on the main lane. In the first to third embodiments, the indicating means M has been provided at the location short of the merging point, but in the fourth to sixth embodiments which will be described below, an indicating means M is provided at the diverging point.

Figure 8:
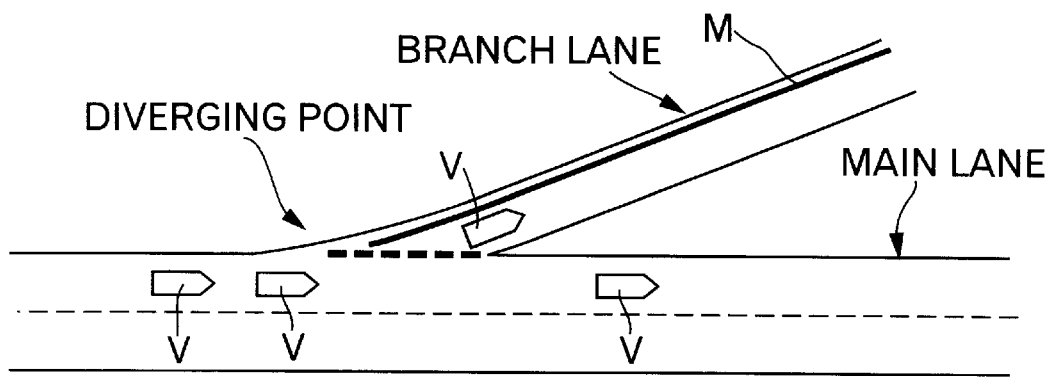
FIG. 8 is a diagram illustrating a fourth embodiment of an indicating means provided at a merging point.

In the fourth embodiment shown in FIG. 8, a line as the indicating means M is placed on a side of a branch lane diverging from a main lane by paint. Thus, by detecting the line with the CCD camera $S_2$ as the viewing means carried on the vehicle V, it can be detected whether the vehicle V has reached the diverging point (i.e., the position of the diverging point) and from which side the branch lane diverges from the main lane (i.e., the shape of the diverging point). The control of the diverging of the vehicle can be properly carried out on the basis of such information. Alternatively, the line may be positioned along a central portion of the branch lane.

Figure 9:
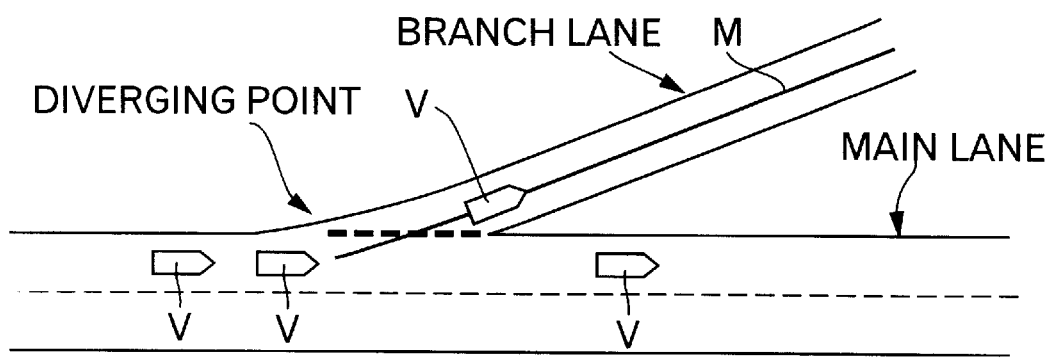
FIG. 9 is a diagram illustrating a fifth embodiment of an indicating means provided at a merging point.

In the fifth embodiment shown in FIG. 9, a phantom line is positioned in such a manner that a large number of reflectors for reflecting light or optical fibers as the indicating means M, are arranged in a line along a central portion of a branch lane diverging from a main lane. Thus, the position and shape of the diverging point can be detected by detecting the line with a laser radar. The line may be positioned along a side of the branch lane.

Figure 10:
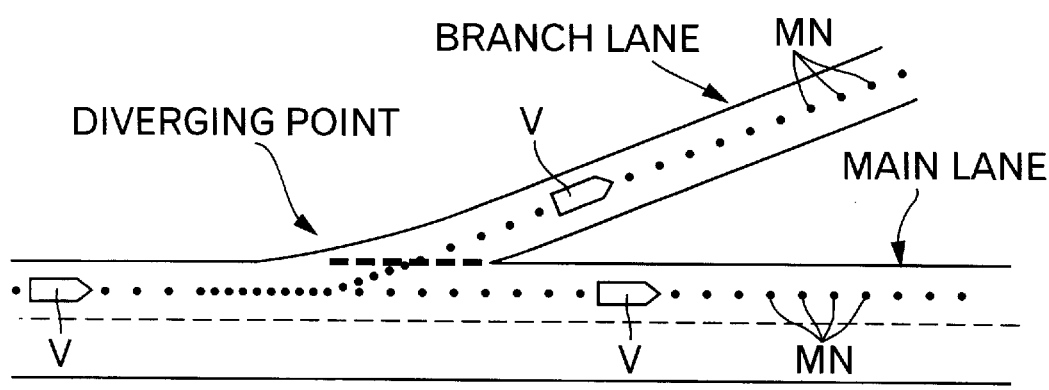
FIG. 10 is a diagram illustrating a sixth embodiment of an indicating means provided at a merging point.

In the sixth embodiment shown in FIG. 10, the indicating means comprises magnetic nails MN detected by the magnetic nail sensors $S_1$. At a location corresponding to the diverging point, the distance between the magnetic nails MN can be changed and the direction of N and S poles may be changed for every nail, for example, as in sequence of N, N, N poles . . . , N, S, N poles . . . , or N, S, N, S, S, N poles . . . , thereby providing information for the position and the shape of the diverging point to the vehicle V.

The indicating means has been provided at the diverging point in the fourth to sixth embodiments, but may be provided at the merging point.

The indicating means M may be formed by placing or drawing, on a road, bit information in the form of lines or letter information comprised of marks of "0" and "1" arranged continuously, in place of a bar code.

As discussed above, the indicating means capable of being detected by the detecting means carried on the automatically traveling vehicle, are provided at the position short of the connection point between the main and branch lanes, whereby the distance from the one vehicle to the connection point is indicated by the indicating means. Therefore, distance information from the one vehicle to the connection point can be provided to the vehicle, to properly perform the control of merging or diverging.

The detecting means is a viewing detecting means, and the indicating means is the bar code provided on a road surface. Therefore, it is possible to provide distance information from the one vehicle to the connection point by reading the bar code with the means.

In an alternative embodiment, the detecting means is a viewing means, and the indicating means is the distance signpost provided on or near the road. Therefore, it is possible not only to provide the distance information from the one vehicle to the connection point by reading the distance signpost with the viewing means, but also it is possible for a driver to directly obtain the distance information by visually perceiving the distance signpost.

The shape of the connection point between the main lane and branch lane is also provided on the distance signpost. Therefore, in addition to the distance information from the one vehicle to the connection point, the information for the shape of the connection point can be provided.

In another embodiment, the detecting means is the magnetic sensor, and the indicating means is the large number of magnetic nails embedded in the road surface. Therefore, the distance information from the one vehicle to the connection point can be provided by detecting the magnetic nails with the magnetic sensor.

The distance from the one vehicle to the connection point is indicated on the basis of the distance between the magnetic nails or the sequence of arrangement of the poles of the magnetic nails. Therefore, distance information can be indicated by changing the distance between the existing magnetic nails or the sequence of arrangement of the poles of the existing magnetic nails.

In another embodiment, the indicating means capable of being detected by a detecting means carried on the automatically traveling vehicle, is provided at the connection point between the main lane and the branch lane, whereby the position and shape of the connection point are indicated by the indicating means. Therefore, information relating to the position and shape of the connection point between the main and branch lanes can be provided to the vehicle to properly perform the control of the merging or diverging.

In one embodiment, the detecting means is a viewing means, and the indicating means is the line provided along the road surface. Therefore, information relating to the position and shape of the connection point can be provided by reading the line with the viewing means.

In an alternative embodiment, the detecting means is the magnetic sensor, and the indicating means is a large number of magnetic nails embedded in a road surface. Therefore, the information relating to the position and shape of the connection point can be provided by detecting the magnetic nails with the magnetic sensor.

In another embodiment, the position and shape of the connection point are indicated on the basis of the distance between the magnetic nails or the sequence of arrangement of the poles of the magnetic nails. Therefore, information relating to various positions and shapes of the connection point can be indicated by changing the distance between the existing magnetic nails or the sequence of arrangement of the poles of the existing magnetic nails.

Although the embodiments of the present invention have been described in detail, it will be understood that the present invention is not limited to the above-described embodiments, and various modifications may be made without departing from the subject matter of the present invention.

What is claimed is:

1. A road system for an automatically traveling vehicle, the road system comprising a road having a main lane, at least one branch lane and a connection point connecting the main lane with the at least one branch lane, indicating means located at the connection point for indicating the position and shape of the connection point, detecting means located in the traveling vehicle for detecting the indicating means, and transmitting means located on or near the road for transmitting information to the traveling vehicle, wherein the vehicle automatically travels based on said information and information provided by communication between the vehicle and other traveling vehicles, wherein the detecting means is a magnetic sensor and the indicating means is a plurality of magnetic nails embedded in a road surface and wherein the position and shape of the connection point are indicated on the basis of the distance between the magnetic nails.

2. A road system for an automatically traveling vehicle, the road system comprising a road having a main lane, at least one branch lane and a connection point connecting the main lane with the at least one branch lane, indicating means located at the connection point for indicating the position and shape of the connection point, detecting means located in the traveling vehicle for detecting the indicating means, and transmitting means located on or near the road for transmitting information to the traveling vehicle, wherein the vehicle automatically travels based on said information and information provided by communication between the vehicle and other traveling vehicles, wherein the detecting means is a magnetic sensor and the indicating means is a plurality of magnetic nails embedded in a road surface and wherein the position and shape of the connection point are indicated on the basis of the sequence of arrangement of poles of the magnetic nails.

* * * * *